(12) United States Patent
Bjorn

(10) Patent No.: US 9,208,305 B2
(45) Date of Patent: Dec. 8, 2015

(54) METHOD AND APPARATUS FOR A TOKEN

(75) Inventor: Vance C. Bjorn, Atherton, CA (US)

(73) Assignee: DigitalPersona, Inc., Redwood City, CA (US)

(*) Notice: Subject to any disclaimer, the term of this patent is extended or adjusted under 35 U.S.C. 154(b) by 63 days.

(21) Appl. No.: 13/584,716

(22) Filed: Aug. 13, 2012

(65) Prior Publication Data

US 2012/0317632 A1 Dec. 13, 2012

Related U.S. Application Data

(63) Continuation of application No. 11/360,377, filed on Feb. 22, 2006, now Pat. No. 8,245,052.

(51) Int. Cl.
*G06F 21/00* (2013.01)
*G06F 21/35* (2013.01)
*G07C 9/00* (2006.01)

(52) U.S. Cl.
CPC ............ *G06F 21/35* (2013.01); *G07C 9/00111* (2013.01); *G07C 9/00309* (2013.01); *G07C 9/00563* (2013.01); *G07C 2009/00365* (2013.01); *G07C 2009/00388* (2013.01); *G07C 2009/00412* (2013.01)

(58) Field of Classification Search
CPC .......... G06F 21/32; G06F 21/34; G06F 21/35
USPC ................. 713/159, 172, 185, 186; 726/9, 20
See application file for complete search history.

(56) References Cited

U.S. PATENT DOCUMENTS

| | | | |
|---|---|---|---|
| 5,973,611 A * | 10/1999 | Kulha et al. | 340/5.62 |
| RE36,752 E | 6/2000 | Koopman, Jr. et al. | |
| 6,078,888 A | 6/2000 | Johnson, Jr. | |
| 6,130,623 A * | 10/2000 | MacLellan et al. | 340/5.1 |
| 6,617,961 B1 * | 9/2003 | Janssen et al. | 340/5.8 |
| 2002/0104006 A1* | 8/2002 | Boate et al. | 713/186 |
| 2002/0109580 A1 | 8/2002 | Shreve et al. | |
| 2004/0198233 A1 | 10/2004 | Pratt et al. | |
| 2005/0232471 A1 | 10/2005 | Baer | |

OTHER PUBLICATIONS

PCT International Search Report and PCT Written Opinion of the International Searching Authority, PCT/US07/04812, Date of Mailing Feb. 27, 2008, 11 pages.
EP Application No. 07751564.1, Supplementary European Search Report, Dated Feb. 25, 2014, 5 pages.

* cited by examiner

*Primary Examiner* — Brandon Hoffman
*Assistant Examiner* — Thong Truong
(74) *Attorney, Agent, or Firm* — HIPLegal LLP; Judith A. Szepesi

(57) ABSTRACT

A method and apparatus of using a token comprises receiving an indication of a presence of a nearby short-range terminal and waking up the token in response to receiving the indication. The method further comprises performing authentication between the token and the terminal, without requiring a user to directly interact with the token.

20 Claims, 14 Drawing Sheets

METHOD AND APPARATUS FOR A TOKEN

RELATED APPLICATIONS

The present application is a continuation of U.S. application Ser. No. 11/360,377, filed on Feb. 22, 2006, which is now U.S. Pat. No. 8,245,052 issuing on Aug. 14, 2012.

FIELD OF THE INVENTION

The present invention relates to authentication devices, and more specifically, to a token for identification.

BACKGROUND

The need to identify oneself to access services is great. It is easy to think of numerous examples encountered on a daily basis—PC logon, Internet sites, airport check-in, credit card purchases, access to office buildings, hotel rooms, conference halls, classrooms, subways, all the way down to the keys to start the car and open the front door to the house. However, no standardization has emerged and as such. This causes great inconveniences for the user due to the burdens of carrying multiple cards and keys, and the need to be able to recall multiple usernames and passwords. In addition to inconvenience, the methods in common use today do not prove identity at all—they merely prove that the user is in possession of a copy of a token. These are issues that governments grapple with in terms of national security, and consumers must encounter because of rampant identity fraud.

Smart cards are one proposed solution. Smart cards are cards that include some processing power and memory. Smart cards taken out for each use, inserted into a reader. In some instances, the user may additionally need to type in a personal identification number (PIN) to access the data/location using the smart card. All this user action is not just time consuming but also requires that the user carry a card. In general, the card readers are also carried. The card can be easily forgotten in the reader or lost.

On the other end of the spectrum, fingerprint recognition is an extremely convenient way to perform identification that has recently become cost-effective to deploy, but security, privacy and scalability issues remain for trusted use beyond local client logon.

SUMMARY OF THE INVENTION

A method and apparatus to use a token comprises receiving an indication of a presence of a nearby short-range terminal and waking up the token in response to receiving the indication. The method further comprises performing authentication between the token and the terminal, without requiring a user to interact directly with the token.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
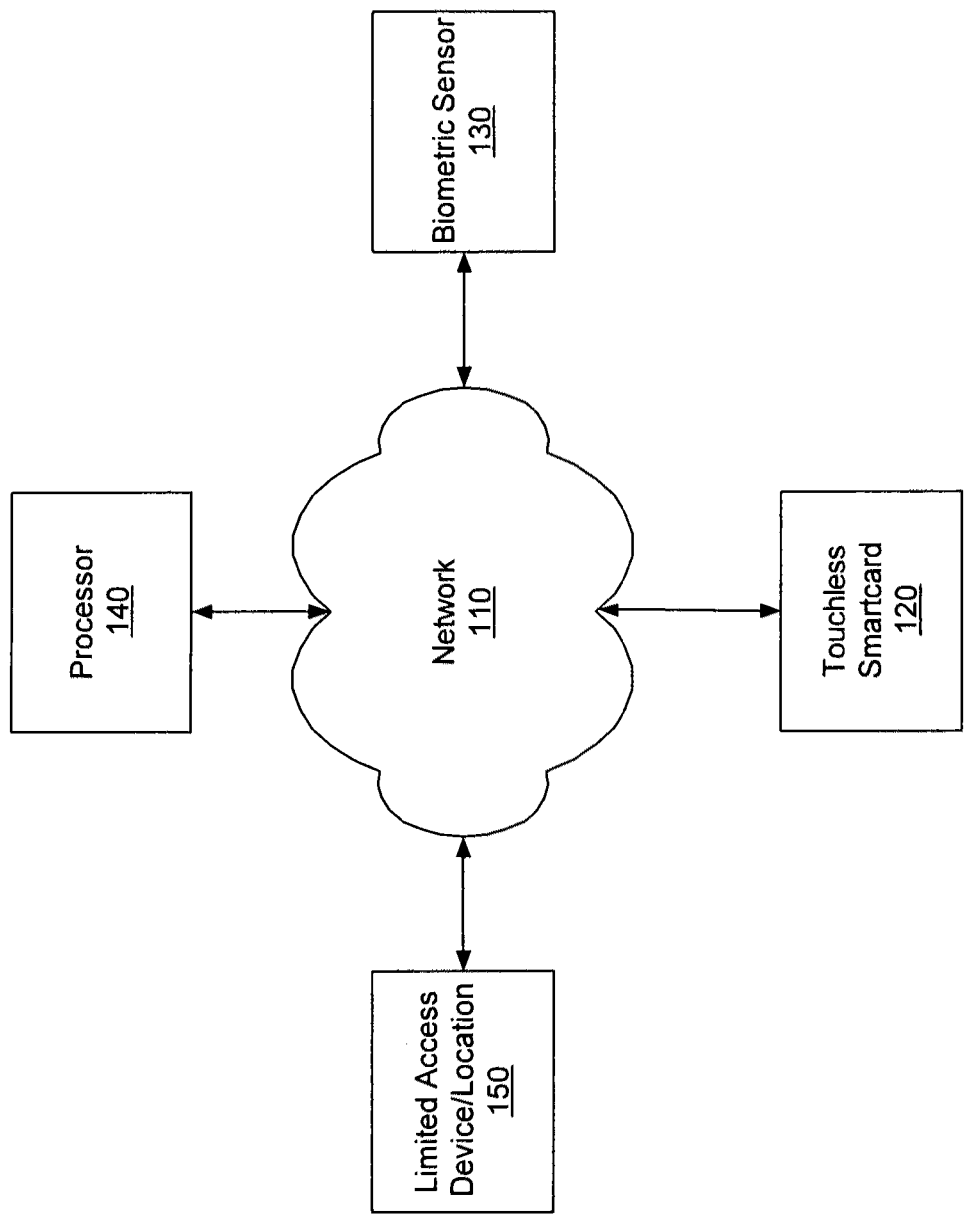
FIG. 1 is a block diagram of one embodiment of a network that may be used with the present invention.

A method and apparatus for a token is described. The device may be small, no larger in size than the wireless device on a key ring used to unlock a car. The device includes a secure processor and a short-range, low-bandwidth wireless transceiver. For one embodiment, the short range is on the order of 2 meters, while the bandwidth is ~100 kbps. The processor may be similar to the processors used on smart cards, while the transceiver may be similar to what is used in Microsoft/Logitech/Intel cordless mice and keyboards. In its secure memory the device maintains the holder's identity information and a fingerprint template for use in authentication. Upon receiving the device, the user initializes the device by uploading identity information to it and then registering one or more fingerprints to be stored and used by the device.

The device may be kept conveniently nearby, such as on the user's key ring, in the user's wallet, on the user's wrist as a bracelet, or in a similar unobtrusive location.

The system, in one embodiment, is concerned with unlocking a token via a biometric feature extraction on the host/terminal, where the match takes place on the token. Data and or keys on the token would be, in a general sense, public (pre-authentication), public (post-authentication), private to issuer (pre-authorization), or private to issuer (post-authorization). That data could be certificates, pseudonyms, private keys, symmetric keys, or other relevant data.

In one embodiment, the device remains in low power, standby mode waiting for a ping from a nearby transmitter. This ping means that the user has approached a terminal that can accept an authentication—for example, a door, a computer, or airport check-in counter. The PC keyboard or door lock contains the transmitter and a fingerprint sensor. When the device receives the ping, it responds and initializes a secure communication channel. The user does not have to touch the device at all—no need to take it out of the pocket or purse—and no identity information is passed at this point. The device then waits for a biometric template to be sent. The terminal uses the biometric sensor to obtain the biometric data, the features are extracted, and the extracted features are sent to the user's wireless token device. The device matches these features against the stored biometric template of the registered user. If it matches, the device releases the stored identity information to the terminal via accepted cryptographic techniques. In this way, the user is provided a convenient, touch-less, wireless identity token.

In another embodiment, the token isn't wireless, but rather receives a signal through the user's body. Instead of a ping from the base station, the token is turned on by the user placing their finger on the sensor platen of the base station.

This sends a low-voltage signal (originating from the thumb on the platen) through the user's body to communicate with the token. This is an alternative means to turn on the token, instead of pinging. While this embodiment uses the user's body to transmit data, the user need not directly interact with the token, since the token in a watch or key fob is in sufficient body contact with the user to receive a signal in this way The examples given below refer to a wireless token. However, one of skill in the art would understand how to implement the token using body-transmission.

FIG. 1 is a block diagram of one embodiment of a network that may be used with the present invention. The user carries a touchless smartcard 120, also referred to as a wireless token. These two terms are used interchangeably herein for a device that provides personal identity and/or confidential information in response to receiving a transceiver ping, without requiring the user to physically touch the device. Note that for body-transmission, the user need not "touch" device. The term "touch"; in this context refers to affirmative interactions between the user and the device, that is, the requirement for the user to interact with the device in some way. The use of passive body transmission does not require an affirmative act, or touch, by the user. Therefore, the smartcard using body conductance can be referred to as a touchless smartcard.

The user, carrying the wireless token 120 comes near a limited access device/location 150, or terminal. The wireless token 120 receives a ping from the limited terminal 150 requesting authentication for access. The limited access device/location protected by terminal 150 may range from a gate, door, or room to a computer, airport terminal, or other location where authentication is required. The touchless smart card 120 interacts with the limited access device/location 150. The user is requested to interact with biometric sensor 130 coupled to the limited access device/location 150. The biometric sensor 130 sends the biometric data for processing to processor 140. For one embodiment, the limited access device/location 150, processor 140, and biometric sensor 130 may be a single integrated device. For another embodiment, the biometric sensor 130 may be directly coupled to the limited access device/location 150 and to the processor 140. For another embodiment, the biometric sensor 130 may be coupled through a secure connection through network 110.

Network 110 may be a wireless network, a wired network, a cable connection, or any other type of connection that permits secure, or securable, communication between the device/location 150 and the biometric sensor 130. For example, communication between the device/location 150, processor 140, and sensor 130 may be through an insecure network, such as the Internet, using a secure protocol, such as secure sockets layer (SSL).

Figure 2:
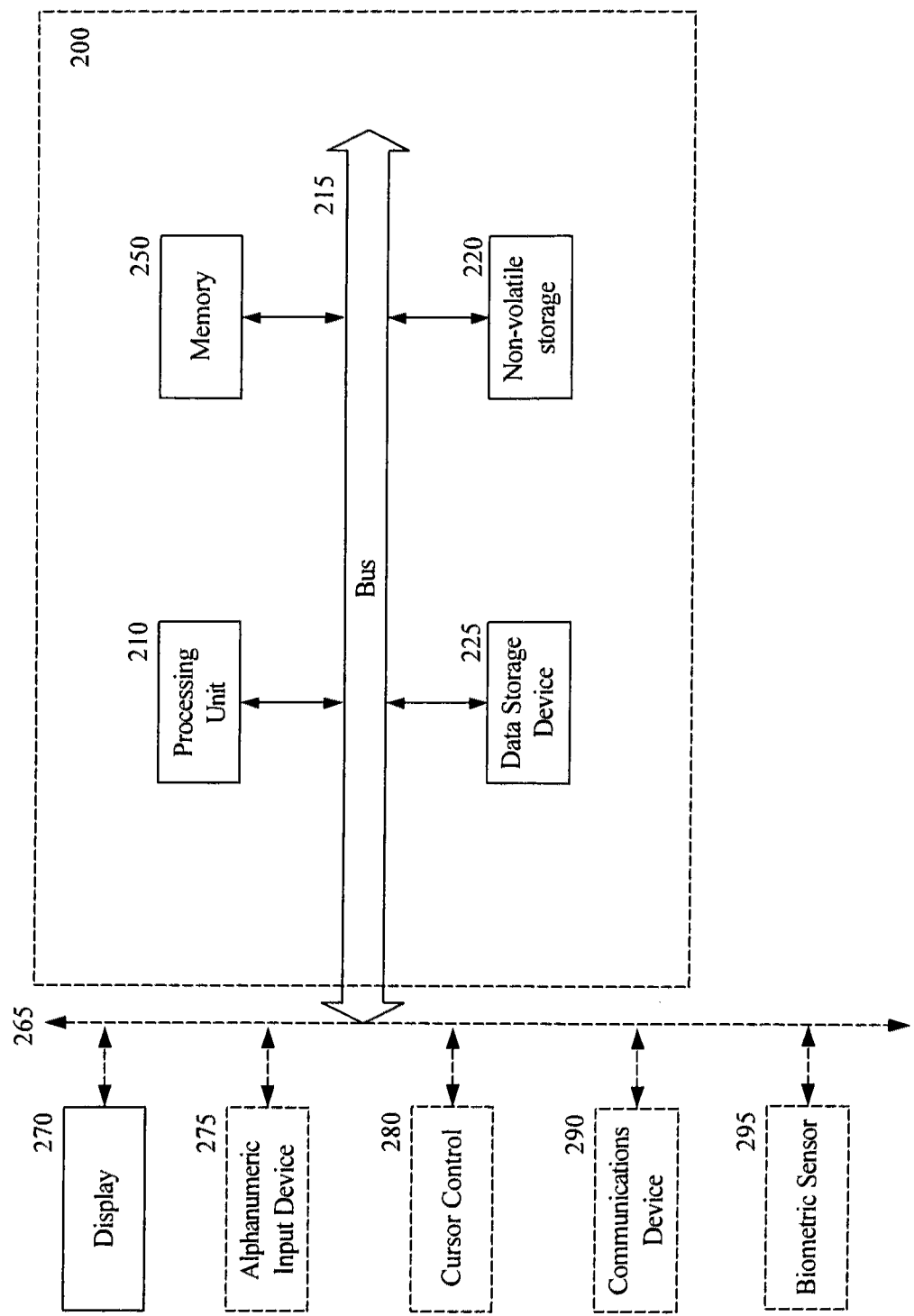
FIG. 2 is a block diagram of one embodiment of a computer system that may be used with the present invention.

FIG. 2 is one embodiment of computer system on which the present invention may be implemented. It will be apparent to those of ordinary skill in the art, however that other alternative systems of various system architectures may also be used.

The computer system illustrated in FIG. 2 includes a bus or other internal communication means 215 for communicating information, and a processor 210 coupled to the bus 215 for processing information. The system further comprises a random access memory (RAM) or other volatile storage device 250 (referred to as memory), coupled to bus 215 for storing information and instructions to be executed by processor 210. Main memory 250 also may be used for storing temporary variables or other intermediate information during execution of instructions by processor 210. The system also comprises a read only memory (ROM) and/or static storage device 220 coupled to bus 215 for storing static information and instructions for processor 210, and a data storage device 225 such as a magnetic disk or optical disk and its corresponding disk drive. Data storage device 225 is coupled to bus 215 for storing information and instructions.

The system may further be coupled to a display device 270, such as a cathode ray tube (CRT) or a liquid crystal display (LCD) coupled to bus 215 through bus 265 for displaying information to a computer user. An alphanumeric input device 275, including alphanumeric and other keys, may also be coupled to bus 215 through bus 265 for communicating information and command selections to processor 210. An additional user input device is cursor control device 280, such as a mouse, a trackball, stylus, or cursor direction keys coupled to bus 215 through bus 265 for communicating direction information and command selections to processor 210, and for controlling cursor movement on display device 270. Additional input devices may include a scanner 285, to scan bar codes associated with images, and audio-input device 295, which receives verbal input from a user. Alternative input devices may also be implemented.

Another device that may optionally be coupled to computer system 200 is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

A biometric sensor 295 may be further coupled to the computer system 200. The biometric sensor 295 may be a fingerprint sensor, for one embodiment.

For one embodiment, display 270, input device 275, and cursor control 280 may be combined into a single touch-screen. The touch screen display permits data entry using a touch sensitive screen.

It will be appreciated by those of ordinary skill in the art that any configuration of the system may be used for various purposes according to the particular implementation. The control logic or software implementing the present invention can be stored in main memory 220, mass storage device 225, or other storage medium locally or remotely accessible to processor 210. Other storage media may include floppy disks, memory cards, flash memory, or CD-ROM drives.

It will be apparent to those of ordinary skill in the art that the methods and processes described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The software of the present invention may also be embodied in a dedicated appliance containing a subset of the computer hardware components described above. For example, the dedicated appliance may be configured to contain only the bus 215, the processor 210, and memory 250 and/or 225, and a touch screen.

The device may also be configured to include a set of buttons or input signaling components with which a user may select from a set of available options. The dedicated appliance may also be configured to include an output apparatus such as a liquid crystal display (LCD) or display element matrix for displaying information to a user of the dedicated appliance.

Conventional methods may be used to implement such a dedicated appliance. The implementation of the present invention for such a device would be apparent to one of ordinary skill in the art given the disclosure of the present invention as provided herein.

Figure 3:
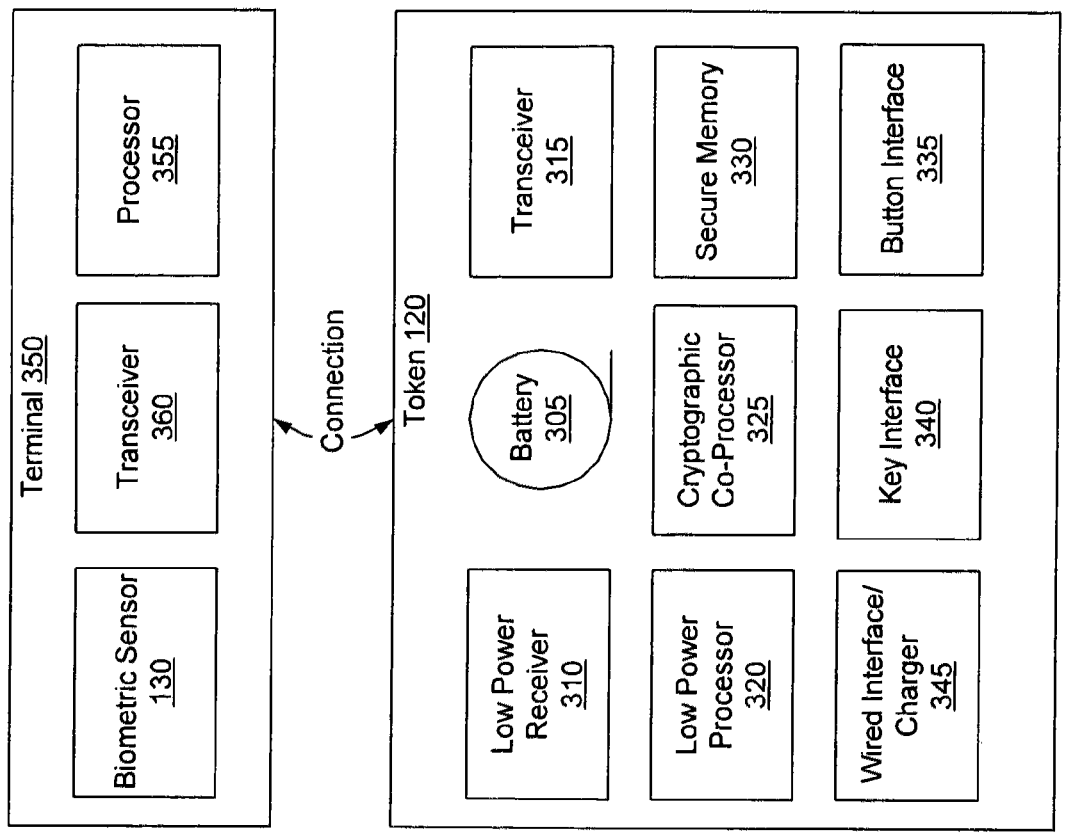
FIG. 3 is a block diagram of one embodiment of the components of the terminal and the wireless token.

FIG. 3 is a block diagram of one embodiment of the components of the terminal and the wireless token. The wireless token 120 includes a low power receiver 310, which is generally ON, and monitors for pings. The wireless token 120 is designed to be portable, as on a key chain. Thus, a power source 305 such as a battery powers the wireless token 120. For one embodiment, the battery 305 may be rechargeable. Alternatively, the battery 305 may be an alkaline battery. For another embodiment, the power source 305 may be an alternative power source, now available or later discovered.

The low power receiver 310 is ON, and monitoring for pings from any terminal 350. As discussed above, terminals 350 include low-radius transmitters 360 that periodically emit a ping. The low power receiver 310 monitors for such a ping.

If a ping is received, it is passed to the low-power processor 320. The low power processor 320 determines whether to "wake up" the remainder of the system. In general, most of the system is on a low, off, or stand-by status, to reduce power consumption. The low power processor 320 determines whether the ping merits a waking up of the system. For one embodiment, only certain pings are responded to. For example, the low power processor 320 may require that the ping be at a particular frequency to wake up the system. This would permit a distribution of transceivers having various frequency ranges.

If the low power processor 320 wakes up the system, the transceiver 315 is used to interact with the terminal 350. The transceiver 315 sends and receives data. As will be discussed in more detail below, the system further includes a cryptographic co-processor 325, to perform the cryptographic operations requested by the user. This permits the establishment of a secure connection between the wireless token 120 and the terminal 350. It further permits the exchange of biometric data, as will be described below. The wireless token 120 further includes a secure memory 330 to store the user's identity information, as well as cryptographic keys, and the user's biometric template for authentication. For one embodiment, only the cryptographic co-processor 325 is able to access the secure memory 330.

The system may further include a key interface 340. The key interface 340 permits a non-biometric-based interaction between the user and the wireless token 120. In general, the user does not need to touch the wireless token 120 to use the wireless token 120 for authentication. However, sometimes a user may not have a recognizable biometric—for example fingerprints may not be sensed after an accident abrades the fingers, or iris scans may be unavailable after an eye exam that dilates the pupils. In that case, the user may use key interface 340 to interact with the system.

A button interface 335 may further be provided. The button interface 335 may release certain specialized data only if the user interacts with the wireless token 120. This will be described in more detail below.

The wireless token 120 may further include a wired interface/charger 345. In general, the wireless token 120 interfaces with outside devices using transceiver 315 and low power receiver 310. However, in some instances, the user may wish to upload data to the wireless token 120, may wish to charge battery 305, or may wish to interact through a wired interface. Thus, the system includes a wired interface 345 for these purposes. The wired interface 345 may be a socket to receive a plug, a USB connection, a firewire connection, a network connection to interface with a wired network, or any type of connection.

The terminal 350 includes a transceiver 360 that sends out periodic pings, as well as interfaces with the wireless token 120. The terminal 350 further includes a biometric sensor 130. For one embodiment, the biometric sensor 130 is a fingerprint sensor coupled to the terminal 350. Furthermore, the terminal 350 includes processor 355, to process the biometric data from sensor 130, as well as to create a secure connection between the terminal 350 and the wireless token 120.

Figure 4A:
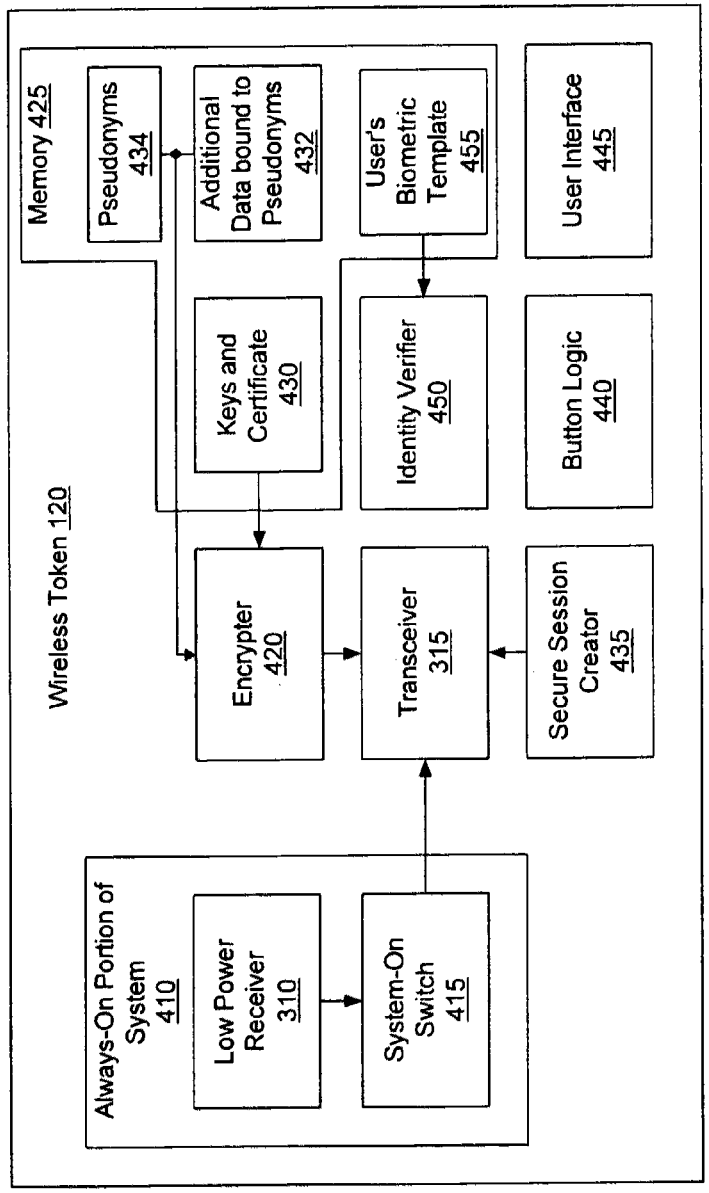
FIG. 4A is a block diagram of one embodiment of the elements of the wireless token.

FIG. 4A is a block diagram of one embodiment of the elements of the wireless token. The wireless token 120 includes an always-on portion 410. The always-on portion 410 of the system includes a low power receiver 310, which monitors for pings from transceivers in the vicinity. If the receiver 310 receives a ping, it passes it on to system-on switch 415. For one embodiment, system-on switch 415 determines whether to wake up the remainder of the system. For another embodiment, the system-on switch 415 automatically wakes up the system when a ping is received.

Upon waking, the transceiver 315 returns data to the terminal from which the ping was received. Using secure session creator 435, a secure session is created between the wireless token 120 and the terminal. For one embodiment, standard wireless methods may be used to create a secure session, such as SSL, or similar protocols. For one embodiment encrypter 420 and keys 430 (public and private keys, for one embodiment) along with a certificate of the public key 430 are used to create such a secure session. This is described in more detail below with respect to FIGS. 6A-B.

Once a secure session is created, the user's pseudonym, from memory 425, is passed to the terminal. The terminal may request a biometric from the user. In general, this may be done by lighting up the biometric sensor. For example, for a fingerprint sensor, the sensor area may be lit, when the biometric is received. The terminal—described with respect to FIG. 4B below—returns the biometric template for verification to wireless token 120. The biometric template is passed to identity verifier 450. Identity verifier 450 uses the user's biometric template 455, also in secure memory 425. If identity verifier 450 determines that the user's biometric matches the data received from the terminal, it returns this data to transceiver 315. Transceiver 315 returns acknowledgement to the terminal, indicating that the user has been authenticated.

For one embodiment, the terminal may be able to access additional data 432 bound to the user's pseudonym 434. In general, the pseudonym 434 is a linked identity, which may not include the user's actual name, email address, or similar data. For example, for Vance Bjorn, the pseudonym may be VB. The additional data 432, which may be accessible to particular terminals, may include VB's full name, home address, and social security number. For example, if the terminal is an airport check-in, such additional data is needed. Thus, if the user and the terminal have previously agreed on additional data to be disclosed, the system may disclose this additional data 432. For one embodiment, the initial negotiation establishes the identity of the terminal. This identity of the terminal may then be used to determine what additional data 432 to release to the terminal, after identity verification.

The wireless token 120 may further include button logic 440. Certain information, such as a social security number of a credit card number may be sufficiently sensitive that a user may wish to only release them after pressing a button. This is enabled using button logic 440. The user may choose such options, as well as register additional data with the wireless token 120 using user interface 445. For one embodiment, user interface 445 actually uses a computer or similar system to interface with the user. For one embodiment, user interface 445 is disabled unless the user is coupled to a secure terminal, or coupled to a computer system via a wired connection.

Figure 4B:
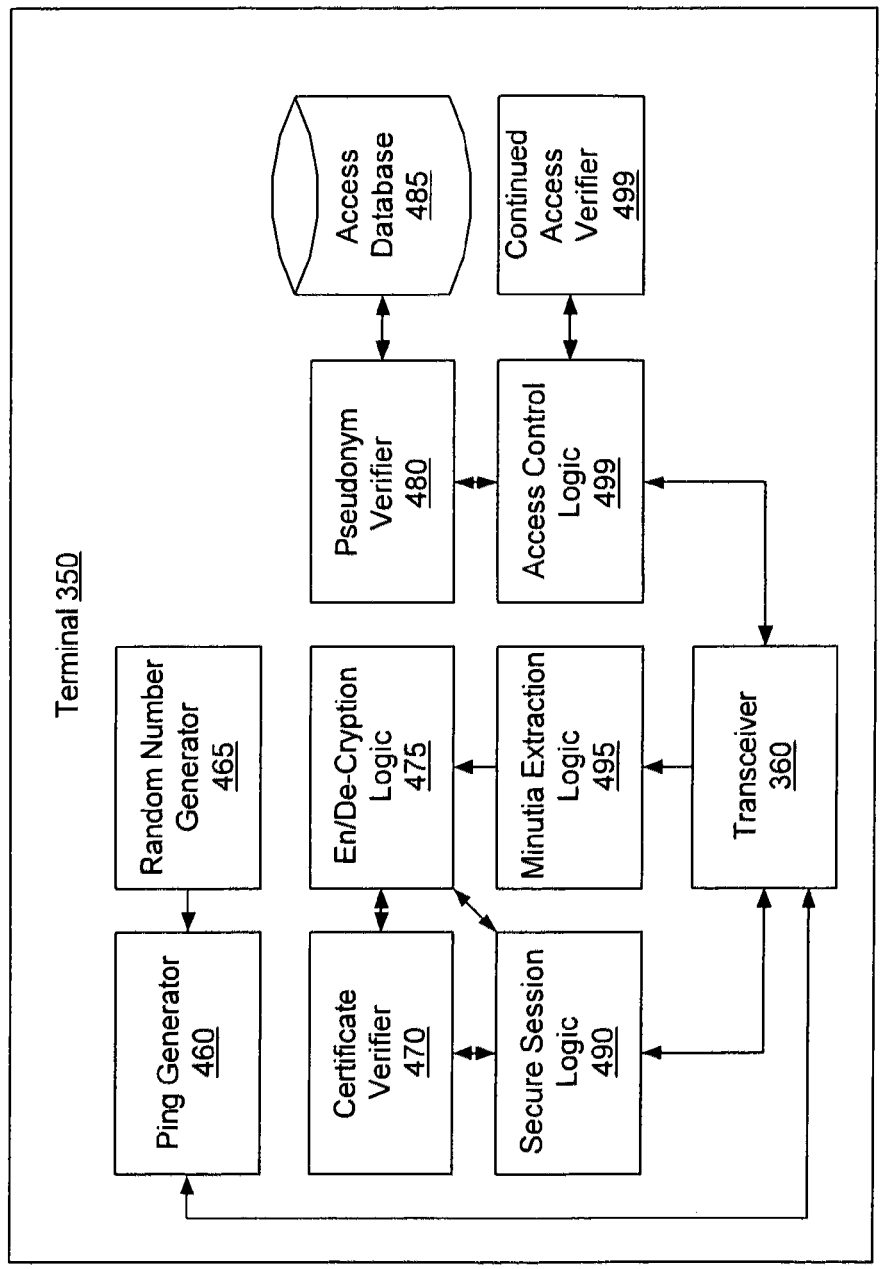
FIG. 4B is a block diagram of one embodiment of the elements of the terminal that interacts with the wireless token.

FIG. 4B is a block diagram of one embodiment of the elements of the terminal that interacts with the wireless token. The terminal 350 may be a single monolithic device, such as a lock-box used for access through a gate. For another embodiment, the terminal 350 may be a distributed system, in which the various component described here are in different locations, and interface using a network.

The terminal 350 includes a transceiver 360, which interacts with other devices. The terminal 350 further includes a ping generator 460, which generates a periodic ping, to initiate contact with a wireless token. The ping generator 460 periodically sends out a nonce, or timestamp. For one embodiment, the nonce is a random number, generated by the random number generator 465. The random number is used to identify whether the ping being responded to is a timely ping response. Thus, for example, if someone captures a ping, in order to set up a false conversation with the terminal 350, the person would have to respond to the ping within a preset time period, such as ½ second. After that time, the ping expires, and a new random number is generated, and used by ping generator 460. This reduces the ability for someone to spoof a terminal 350 or a wireless token 120.

In some cases, the transceiver 360 receives a response from a wireless token. The response, in general, includes the random number of the ping, as well as a certificate, identifying the wireless token.

The secure session logic 490 uses this data—if certificate verifier 470 indicates that the wireless token's certificate is valid—to establish a secure session between terminal 350 and the wireless token. For one embodiment, the secure session uses encryption, based on public key cryptography to establish the secure communications channel. For one embodiment, en/decryption logic 475 is used to encrypt and decrypt the data flow.

Once a secure session is established, the terminal 350 receives the user's pseudonym from the wireless token. Pseudonym verifier 480 determines whether the user's pseudonym is in the access database 485. If the user's pseudonym is in the access database 485, this information is passed to access control logic 499. Access control logic 499 determines what type of verification is needed for access through the terminal. As discussed above, the terminal may range from a low security door, to a high security computer system. Thus, the verification level may range from a pseudonym only to biometric verification.

If biometric verification is needed, the access control logic 499 requests a biometric from the user. For one embodiment, this is done by lighting up or otherwise drawing attention to a biometric sensor. This may be done via a display, lights, or other means. On receiving the biometric from the user, the biometric is passed to minutia extraction logic 495. Minutia extraction logic 495 extracts the relevant data from the biometric, and creates a biometric template. Of course, the biometric-appropriate unique characteristics are extracted. For simplicity, the term "minutia" will be used to describe these unique characteristics.

The transceiver then sends this biometric template to the wireless token for verification. If the verification is positive, the access control logic 499 may provide access to the system protected by terminal 350. The access control logic 499 may further require additional linked information from the user's wireless token. This information is released, on request, to the terminal 350. If the appropriate information is received, the access control logic 499 permits access to the protected area/system.

For one embodiment, if the protected area/system is continuously accessed over a period of time by the user—as a secure computer system—the continued access verifier 498 periodically pings the wireless token to verify that the wireless token continues to be in the vicinity of the terminal 350. In this way, the terminal 350 provides continuously verified access to a secured system.

Figure 5:
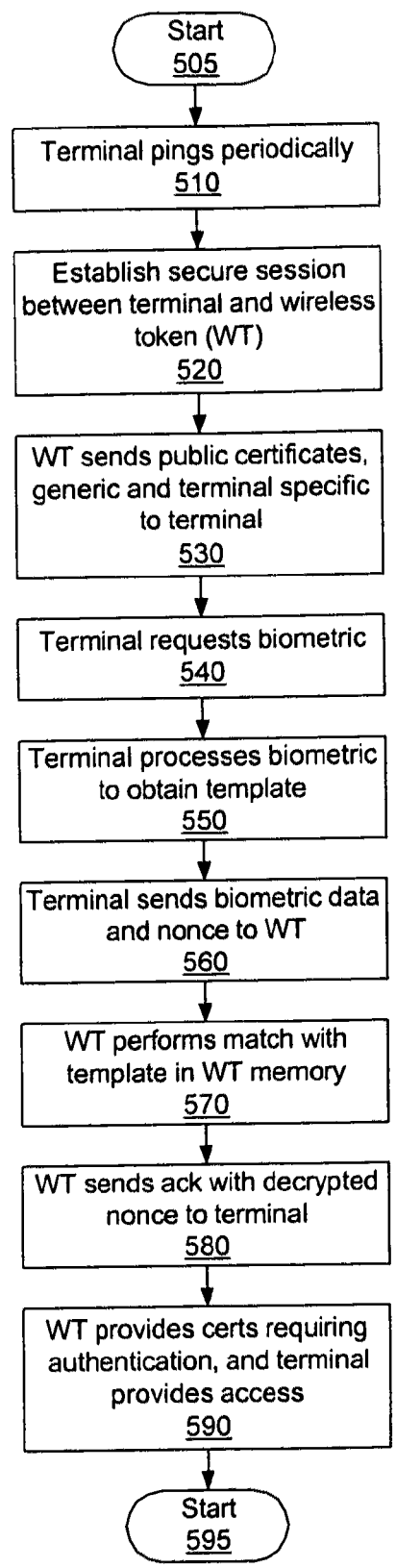
FIG. 5 is an overview flowchart of the present process.

FIG. 5 is an overview flowchart of the present process. The process starts at block 510. At block 510, the terminal sends out periodic pings. If a wireless token is sufficiently near the terminal to receive the ping, it responds. For one embodiment, the radius of the terminal is approximately 2 meters (6 feet). For another embodiment, the radius of the terminal may differ depending on the type of terminal. Thus, the radius of a door terminal may be 3 feet, while the radius of a computer terminal may be 10 feet, permitting a user to walk around an office and stay logged into the system. The radius may be adjustable from a few inches to a few yards. For one embodiment, cordless phone or digital spread spectrum technology is used for the base transmission.

When a wireless token responds to a ping, a secure connection, such as an SSL link, is established between the terminal and the wireless token, at block 520.

At block 530, the public certificates and the private certificates available to this particular terminal are sent to the terminal by the wireless token. Each certificate and private key has access control such that it is public or private—can be read by anyone or only by the authority which created it. Furthermore, each certificate has a release authorization such that it may be released with no authentication or require biometric authentication. Each identity data object has these two attributes, public/private and authentication needed/not needed. At this point, the certificates which are private or public, and which do not require authentication, are sent to the terminal.

At block 540, the user's biometric authentication is requested. For one embodiment, this only occurs if some of the certificates, authentications, and/or data require biometric authentication. If no biometric authentication is needed, the process may end after block 530. Authentication may be through a fingerprint, placed on a fingerprint sensor. The fingerprint sensor is associated with the terminal, and is controlled by the terminal.

At block 550, the biometric data is processed by the terminal, or a processor associated with the terminal, and a biometric template is generated.

At block 560, the biometric template is sent to the device, with a nonce. The nonce indicates the current time and day, as well as the identity of the terminal. It is further encrypted with the wireless token's public key, such that only the appropriate wireless token is able to access the nonce and return it.

At block 570, a match is performed on the device, verifying that the fingerprint template matches the fingerprint template of the user. This match is done on the token. This provides additional security, because the template is stored in a different location for each user, and is not accessible without the token.

At block 580, the wireless token returns an acknowledgement that the authentication was successful, along with the decrypted nonce.

At block 590, the wireless transceiver sends the public and private certificates that require authentication to the terminal at this point. Access is provided to the user, as appropriate. The process then ends at block 595.

The present process provides a touchless interaction for a user, which permits the user to perform authentication for four types of data. The types of data range from private (terminal specific) data requiring authentication at one end of the spectrum, to public (released to all terminals) data requiring no authentication.

Figure 6A:
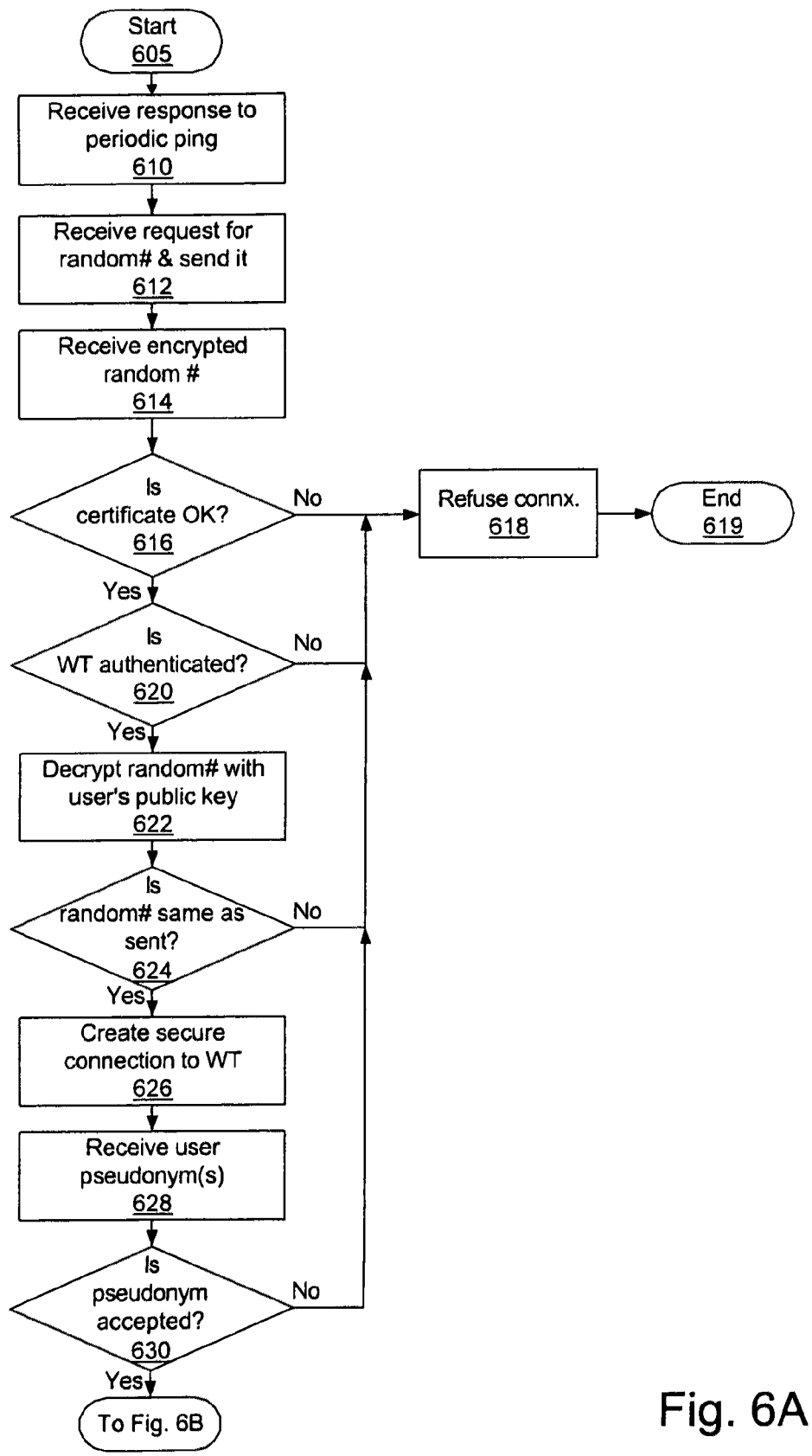
FIGS. 6A-C are flowcharts of one embodiment of using the wireless token from the perspective of the terminal.
Figure 6B:
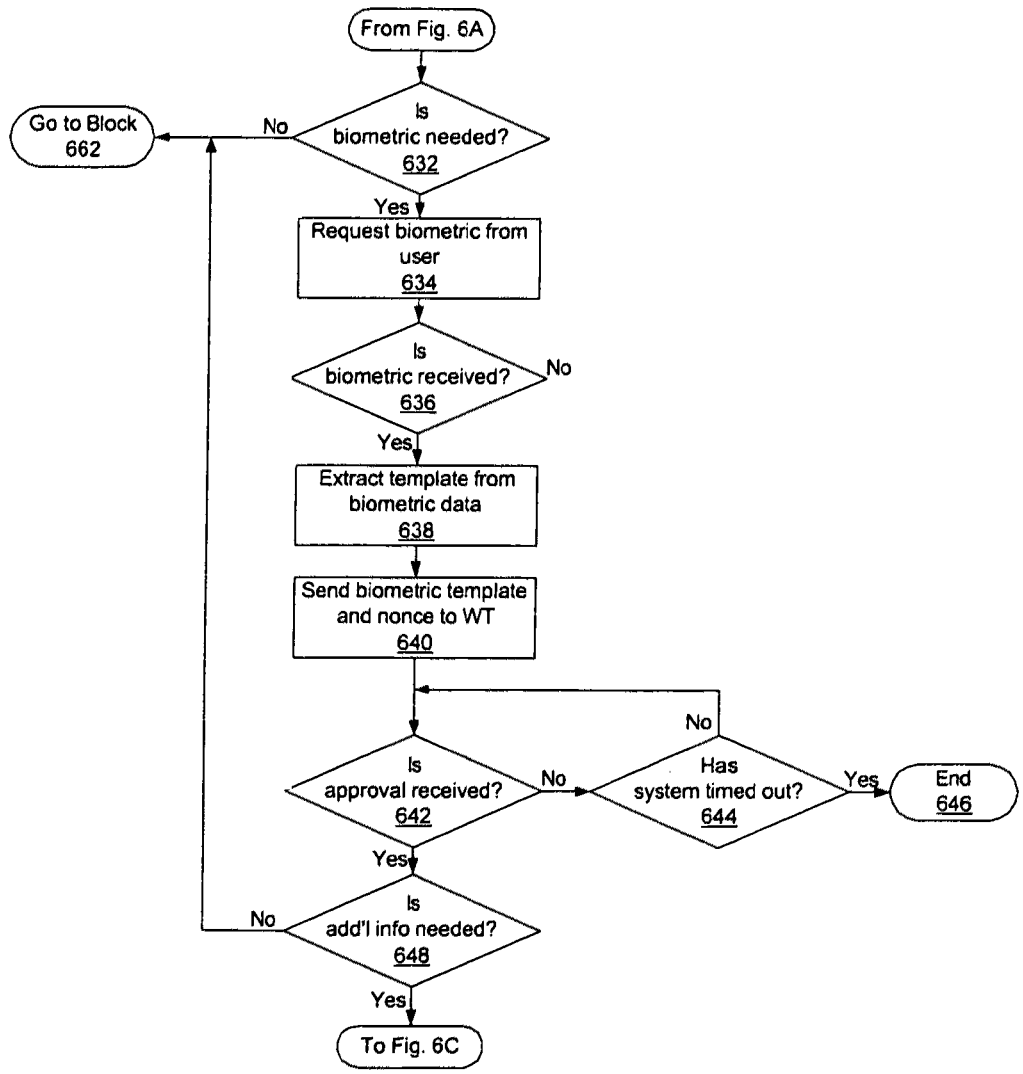
Figure 6C:
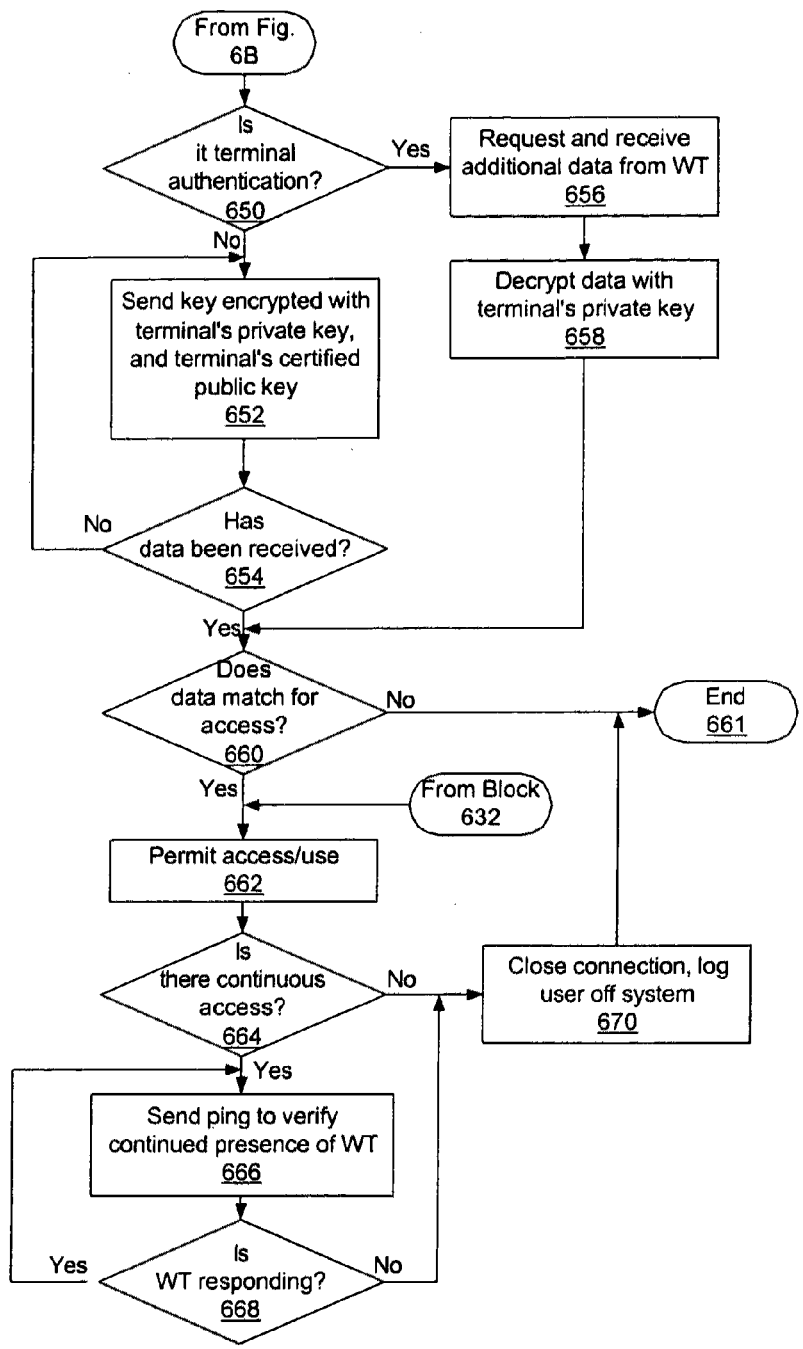

FIGS. 6A-C are flowcharts of one embodiment of using the wireless token from the perspective of the terminal. The process starts at block 605. At block 610, a ping is sent by the terminal, and the system determines whether there has been a response. If there has not been a response, the process returns to block 610, to send out another ping. For one embodiment, pings are sent out periodically, whether or not there are currently active sessions with wireless tokens. For one embodiment, the periodic ping may be once per second. For one embodiment, a separate process monitors whether a response has been received. For one embodiment, a new process is spawned for each response. Thus, a single terminal may be able to interact with multiple different wireless tokens at the same time.

As discussed above, the ping may or may not include a random number. If the ping does not include a random number, a wireless token that wishes to interact with the system sends a request for a random number, at block 612, which is promptly sent out. Alternatively, the ping may be a random number itself, in which case block 612 may be skipped.

At block 614, the encrypted random number is received back. The encrypted random number further includes a copy of the certified public key of the wireless token that is responding to the terminal's ping.

At block 616, the process determines whether the certification accompanying the wireless token's public key is still valid. Certificates may be invalid because they have expired, or because a user has reported that their token has been cracked. Thus, for on embodiment, the system accesses a certificate server to verify that the certificate received is authentic, granted by an accepted certificate server, and valid. If the certificate is not good, the process continues to block 618, and the connection is refused. The process then ends at block 619.

If the certificate is valid, the process continues to block 620. At block 620, the process determines whether the wireless token's integral authentication is acceptable. For one embodiment, each wireless token is provided with an integral authentication system, such as a "serial number." This integral authentication of the wireless token is used to prevent someone from making "false wireless tokens" and passing them off. If the wireless token integral authentication fails, the process continues to block 618, and ends. Otherwise, the process continues to block 622.

At block 622, the encrypted random number, returned by the wireless token, is decrypted, using the public key provided in the certificate.

At block 624, the process determines whether the random number that was received was a valid number that was sent out by this terminal. This prevents the wrong terminal from accepting a connection to a wireless token. Furthermore, it prevents a false wireless token from returning a stale, old random number for authentication. If the random number is invalid, the process continues to block 618 and ends. Otherwise, the process continues to block 626.

Some or all of the above authentication steps may be skipped in some implementations. At a minimum, the terminal must receive a response from a wireless token, which indicates that the wireless token is in the area.

At block 626, a secure connection is created between the wireless token and the terminal. For one embodiment, the public key of the wireless token is used to encrypt a session key, which is used for the secure session.

At block 628, the terminal receives the user's pseudonym. The user's pseudonym is a persistent pseudonym, which is associated with a particular user, and the particular wireless token. The pseudonym may have no easily traceable connection to the user's real name.

At block 630, the process determines whether the pseudonym provided by the user is in the set of accepted pseudonyms. The terminal, as discussed above, is a gateway device that provides restricted and secured access to some location or system. Thus, there is a list of users who may be given this access. The system determines whether the user's pseudonym is among those that are permitted access. If the user's pseudonym is not found in the access authorized set, the process continues to block 618, and ends. Note that in each of these cases, there may be a communication with the user indicating that access is not being provided. For another embodiment, the communication with the user may indicate the reason for the failed access—e.g. certificate invalid, integral authentication failed, random number not valid, or user not authorized. For another embodiment, the system may not communicate any of this with the user, and simply drop the connection between the terminal and the wireless token. For one embodiment, the terminal's preferences as to communication level may be set by the administrator.

At block 632, the process determines whether a biometric is needed for access. The system may require a user biometric for authentication, or the pseudonym information alone may be sufficient. If the pseudonym is sufficient, the process continues to block 662. At block 662, access is provided to the user.

If a biometric is needed for access, the process continues to block 634. At block 634, the biometric is requested. This may be done by communicating with the user via a message, or by indicating to the user in some manner that a biometric is requested.

At block 636, the process determines whether a biometric has been received. For one embodiment, this process may further test whether a readable biometric has been received. If no biometric has been received, or the quality of the received biometric is such that it cannot be used, the process returns to block 634, to request another biometric. If a biometric has been received, the process continues to block 638.

At block 638, the system extracts a template from the biometric. For a fingerprint, the template includes the minutiae of the fingerprint, as well as various other characteristics.

At block 640, the extracted biometric template is sent to the wireless token. As noted above, the connection between the terminal and the wireless token is secure. For one embodiment, the token may additionally be encrypted, prior to sending it to the wireless token.

At block 642, the process determines whether an approval has been received from the wireless token, verifying that the biometric template matches the biometric of the owner of the wireless token. If no approval has been received, the process continues to block 644. At block 644, the process determines whether a time-out has been reached. If no time-out has been reached, the process continues to wait for approval. If the timeout has been reached, the process continues to block 646, and ends. For another embodiment, the process may return to block 634 and request a new biometric for reverification. This preference may be set by the administrator.

If approval has been received, the process continues to block 648. At block 648, the process determines whether additional information is needed for access. As discussed above, the pseudonym does not include the user's legal name, or similar data, initially. Thus, for some terminals, such as ones used for airport access, the user's legal name may be required as well. If additional information is needed for the access, the process continues to block 650. Otherwise, the process continues to block 662, where access is permitted.

At block 650, the process determines what type of authentication was used, when the data was initially arranged between the terminal and the user. The authentication may be terminal based authentication, where data is encrypted but released to all terminals on request, or wireless token based authentication, where data is released only to the terminal that has authorization to receive the data.

If wireless token based authentication was used, the process continues to block 652. At block 652, the key encrypted with the terminal's private key, along with a certified public key of the terminal is sent to the wireless token. For one embodiment, this data may have been earlier exchanged, in which case the system need not send another copy of the terminal's public key. The wireless token then attempts to decrypt the envelope surrounding the additional data, with the public key of the terminal. If the public key successfully decrypts the data, then the terminal is authorized to access the data. The wireless token therefore sends the additional data to the terminal.

At block 654, showing the process from the perspective of the terminal, the process determines whether the requested data has been received. As described above, the authentication of the data is done by the wireless token. Thus, if the authentication is successful, the data is received at block 654. If the data is not received, the process continues to wait. For one embodiment, after a period of time, the process may resend the request and public key. If the data is received, the process continues to block 660.

At block 660, the process determines whether the received data matches the authentication data associated with the user. If so, the process continues to block 662, and access is permitted. Otherwise, the process ends at block 646.

If, at block 650, terminal-based authentication is used, the process continues to block 656. At block 656, the additional data is requested and received from the wireless token. The received data, however, is encrypted with the key of the terminal that had originally been authorized for the data. Thus, the data is only accessible if the terminal has the key.

At block 658, the data is decrypted using the terminal's key. For one embodiment, the key is the terminal's private key. For another embodiment, a separate "additional data key" may be used for this process.

The additional data is stored on the wireless token encrypted with the terminal's public key, and thus inaccessible to anyone who doesn't have the terminal's private key. The process then continues to block 660, to verify that the data matches the authentication data.

If the user is successfully authenticated—through pseudonym only, pseudonym and biometric, or pseudonym, biometric, and additional information—at block 662, access to the restricted data/location is provided.

At block 664, the process determines whether the access is a continuous access, as using a computer, or a one-time access, as through a gate or door. If the access is a one-time access, the process continues to block 670. At block 670, the connection with the wireless token is closed, and at block 672, the process ends. If the connection is a continuous one, the process continues to block 666.

At block 666, the terminal pings the wireless token to verify that the wireless token continues to be in proximity to the terminal. The ping may be periodic. For one embodiment, the ping is once per minute. However, the period between pings may vary, depending on the level of security needed. In extreme security situations, the connection may be maintained continuously between the wireless token and the terminal. In less secure situations, the ping may be reduced to once every 30 minutes or even longer. For one embodiment, this period may be adjusted by the administrator.

At block 668, the process determines whether the wireless token remains in the proximity of the terminal. If so, the process returns to block 666, to once again ping after the preset period has elapsed. If the wireless token is no longer in proximity to the terminal, the process continues to block 670.

At block 670, the connection, if it remains open, with the wireless token is closed. Any unlocked access is locked once again, to require reverification for further access. The process then ends at block 672. In this way, the terminal provides continuous secure access, at one of a variety of levels of security, using a wireless token that does not require the user to actually touch the wireless token.

Figure 7A:
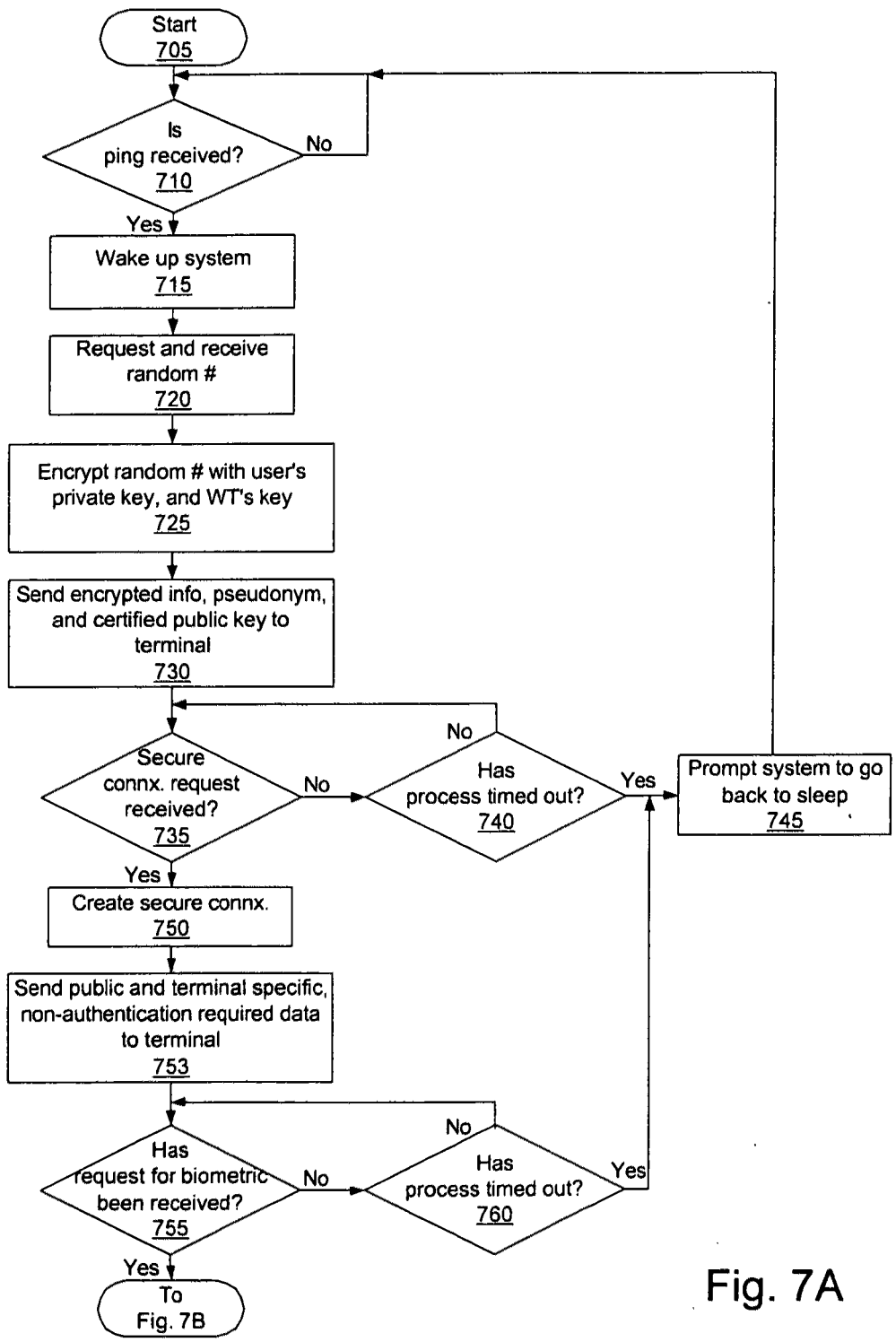
FIG. 7A-B are flowcharts of one embodiment of using the wireless token from the perspective of the wireless token.
Figure 7B:
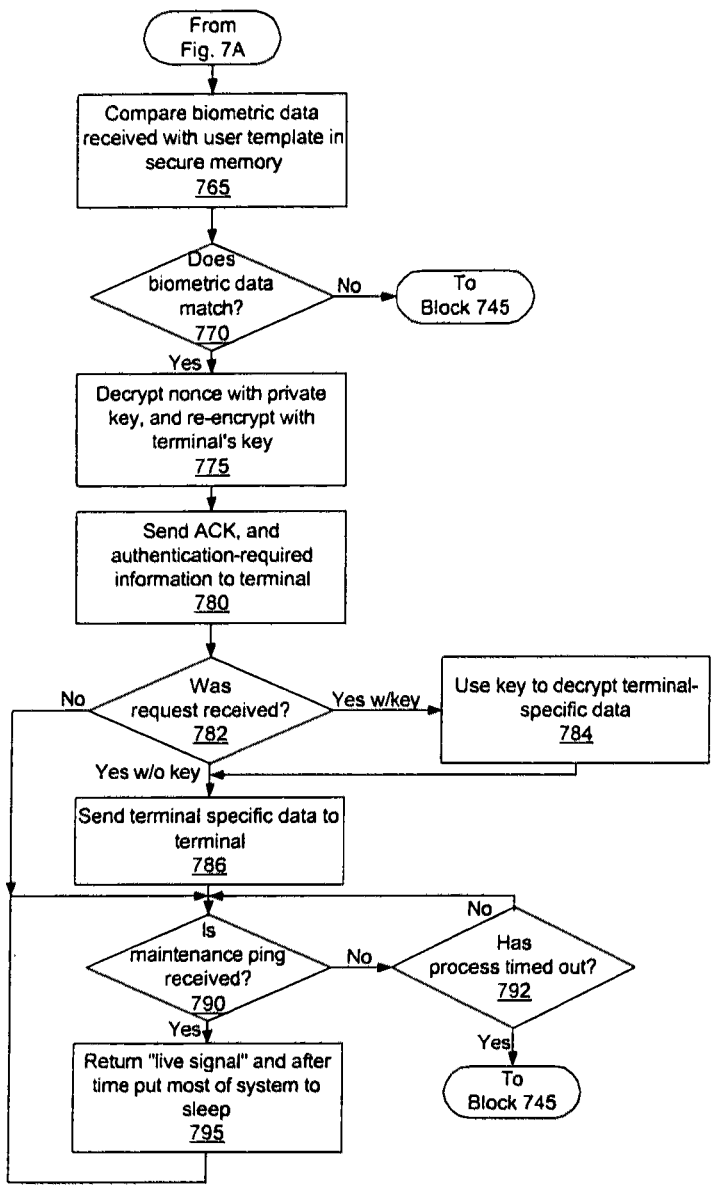

FIGS. 7A-B are flowcharts of one embodiment of using the wireless token from the perspective of the wireless token. The process starts at block 705. For one embodiment, this is a continuous monitoring process, whenever power is available to the wireless token.

At block 710, the process determines whether a ping was received. A ping is received when the wireless token comes within the broadcast radius of the terminal. If no ping is received, the wireless token continues to monitor. For one embodiment, the portion of the wireless token that is used for monitoring is an analog portion, which has extremely low power consumption. Thus, this monitoring process may be maintained for an extended period without changing or charging the batteries. If a ping is received, the process continues to block 715.

At block 715, the system is woken up. As noted above, the monitoring portion of the system is a low-power system, while for the secure communication, encryption, and authentication steps, a higher power system is needed.

At block 720, a random number is requested and received from the terminal, from which the ping was received. For one embodiment, the ping itself incorporates a random number, in which case this block may be eliminated.

At block 725, the random number is encrypted with the user's private key, and the wireless token's own key as well.

At block 730, the encrypted random number, along with the user's public pseudonym(s) and information, and a certified public key of the user is sent to the terminal. For another embodiment, the public pseudonym(s) are not sent until a secure session is established.

At block 735, the process determines whether a secure connection request has been received from the terminal. The secure connection request, for one embodiment, includes a session key encrypted with the user's public key. If the secure connection request has not yet been received, the process continues to block 740. At block 740, the process determines whether the waiting period has exceeded the time-out period. For one embodiment, the time-out period may be as short as a fraction or a second, or as long as a few minutes. If the time-out period has not yet been exceeded, the process returns to block 735, to wait for a secure connection request. If the timeout period is exceeded, the process continues to block 745. At block 745, the system again goes to sleep, leaving only the ping-monitoring portion of the system awake. The process then returns to block 710.

If a secure connection request is received, at block 735, the process continues to block 750.

At block 750, a secure connection is created between the terminal and the wireless token. If the pseudonyms and information not requiring authentication were not sent previously, they are sent at this point, at block 753. This information may include public information, as well as information specific to the requesting terminal.

The wireless token does not monitor what other pseudonyms or related information it has available that may be applicable for this terminal. Rather, the wireless token simply waits to determine whether a biometric template has been received, at block 755. If a biometric template is not received, the process continues to block 760. At block 760, the process determines whether the waiting period has exceeded the time-out period. For one embodiment, the time-out period may be as short as a fraction or a second, or as long as a few minutes. If the time-out period has not yet been exceeded, the process returns to block 755, to wait for a biometric template. If the timeout period is exceeded at block 760, the process continues to block 745. At block 745, the system again goes to sleep, leaving only the ping-monitoring portion of the system awake. The process then returns to block 710.

If a biometric template is received, at block 755, the process continues to block 765.

At block 765, the process compares the biometric data received from the terminal with the biometric template of the user, stored in secure memory. At block 770, the process determines whether the user's biometric template matches the biometric data from the terminal. If the two do not match, the process continues to block 745, and goes to sleep. For one embodiment, a notice of the failed match is sent to the terminal. For one embodiment, the terminal tracks consecutive failed matches. For one embodiment, after a preset number of failed matches, or a preset number of consecutive failed matches, the secure data is purged from the token. In that instance, the user must re-register with a trusted server in order to use the token again. This prevents a thief from stealing the token and then attempting access repeatedly with various biometric mockups until access is provided.

If the biometric template matches the biometric data, the process continues to block 775. At block 775, the nonce is decrypted with the private key of the user. The nonce is a time/date stamp or similar data identifier that verifies that the biometric data received by the wireless token is the biometric data that was extracted by the terminal. The nonce, for one embodiment, the biometric data is encrypted with the public key of the wireless token, by the terminal. For one embodiment, the nonce may be re-encrypted with the public key of the terminal (e.g. signed).

At block 780, the acknowledgement of a match is returned to the terminal, along with the decrypted nonce, and any further pseudonym/data that requires biometric authentication. For one embodiment, the acknowledgement, nonce, and other data are sent encrypted with the terminal's public key as well, to add additional security.

At block 782, the process determines whether a request for additional terminal-specific data has received. If not, the process continues directly to block 790.

If a request for additional terminal specific data is received, the process determines whether the request included a key or not. If no key is included, the process continues to block 786. At block 786, the terminal specific data is sent, if it is encrypted. Since the data is encrypted with the terminal's public key, and thus is accessible only to the terminal.

If a key is included, the key is signed with the terminal's private key, and includes a certified copy of the public key of the terminal. The process continues to block 784. At block 784, the identity of the terminal, and the fact that this data is associated with the requesting terminal, is verified, using the keys. If the decryption process is successful, the process continues to block 786, and the data is sent to the terminal. The process then continues to block 790. At block 790, the process determines whether a maintenance ping has been received. The maintenance ping is periodically sent by the terminal to verify that the wireless token remains in the vicinity.

If no maintenance ping is received, the process determines whether a process has timed out, at block 792. For one embodiment, there is a default time-out period for the maintenance ping. For another embodiment, the terminal may communicate its maintenance ping period to the wireless token at the initial connection. The timeout is then dynamically set. For one embodiment, the timeout is set to be slightly longer than the maintenance ping period of the terminal. If the system times out, at block 792, the process returns to block 745, to go to sleep again. If the timeout period has not yet elapsed, the process continues to monitor for a maintenance ping at block 790.

If a maintenance ping is received, the process, at block 795, returns a "live" signal to the terminal, indicating that the wireless token remains in proximity to the terminal. For one embodiment, during the maintenance period, portions of the system may be put to sleep—such as encryption and decryption elements, memory access logic and the like—while communications elements are maintained awake. The process then returns to block 790, to await a next maintenance ping.

In this way, a wireless token may be used, without requiring any human interaction with the token itself. This is advantageous for authentication and access in a large range of environments, from corporations, to physical access, financial transactions, airline security checks, hotel room doors, starting cars, or any other uses.

Figure 8:
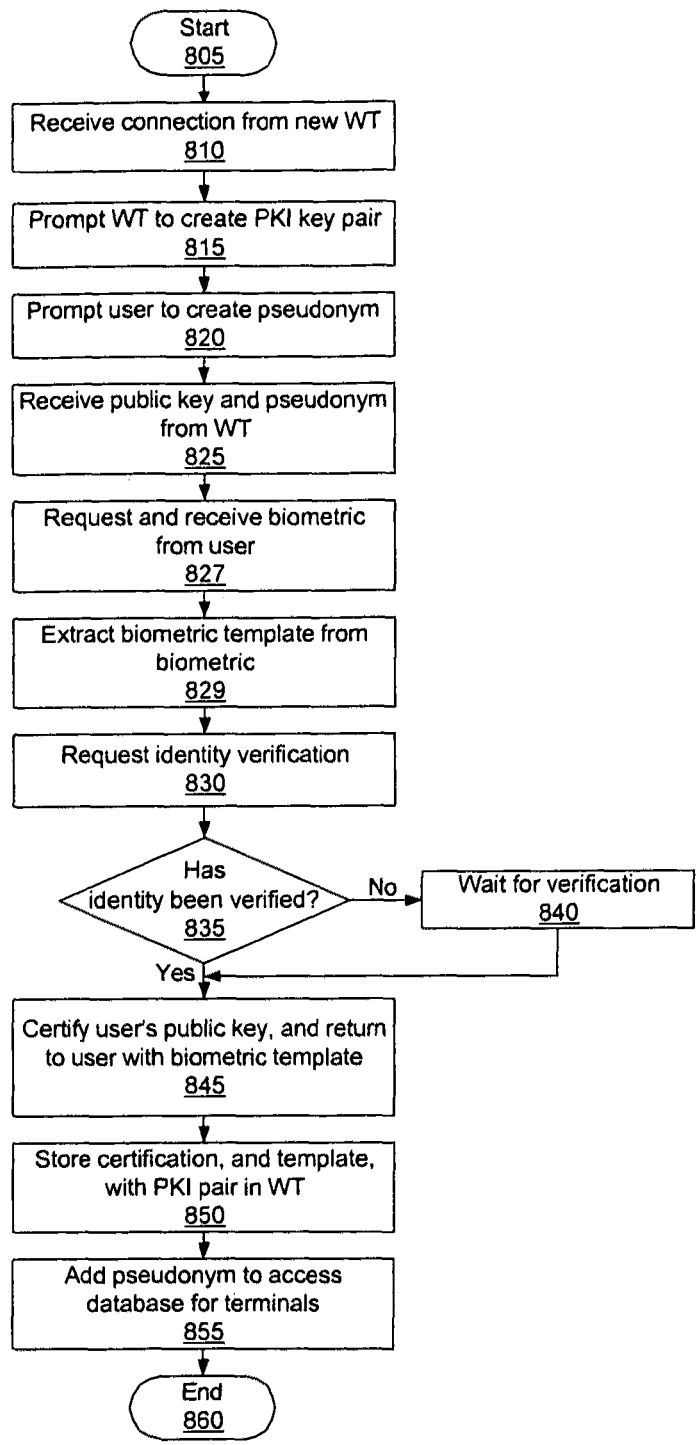
FIG. 8 is a flowchart of one embodiment of initiating a new wireless token.

FIG. 8 is a flowchart of one embodiment of initiating a new wireless token. The process starts at block 805. At block 810, a connection is received from a new, uninitiated wireless token. For one embodiment, this connection may be to a web page. For another embodiment, this connection may be to a secure server on the same network. For example, a corporation may have an internal server that provides such initialization services. The connection is a secure connection.

At block 815, the server prompts the wireless token to create a public-private key pair. At block 820, the user is prompted to create a pseudonym. The pseudonym is a persistent anonymous pseudonym, and need not have any connection to the user's actual name and/or identity. However, in a corporate environment, the policy may be to have a pseudonym that is identical to the user's real name, or the user's email address, or some similar unique identifier. There is no inherent limitation on the possible pseudonyms. However, each organization/institution/server may impose its own preferred limitations.

At block 825, the server requests, and receives, the public key and pseudonym from the wireless token. For one embodiment, the key pair and pseudonym are interactively created, with the user interface provided by the server. In that instance, the server may send the pseudonym to the user.

At block 827, the server receives a biometric from the user. The biometric may be a fingerprint, multiple fingerprints, an iris scan, a handprint, a voiceprint, any other type of biometric, or a combination of multiple biometrics.

At block 829, the server extracts the underlying biometric data from the user's biometric. For a fingerprint, a template is created, including minutiae, and potentially additional features. Similarly, a listing of unique features that may be used to identify the user is created for each type of biometric.

At block 830, the server requests identity verification. Identity verification may be via a credit card and billing information, a driver's license, or verification by a trusted individual such as an administrator.

At block 835, the process determines whether identity verification has been received and verified. If not, the process, at block 840, waits for verification. This process may at this point be discontinued. For example, if physical paper proof is being sent to the server, the initialization process may be discontinued, until verification is received. Thus, the user may be informed that he or she should connect the wireless token to the server again at some future time, after identity has been successfully verified.

If the identity has been successfully verified at block 835, the process continues to block 845. Alternatively, the processes of block 830, 835 and 840 may be skipped, and the user may not be required to provide any truly authenticated personal data.

At block 845, the server, who is a certification authority, generates a certificate with the user's public key, and returns the certified public key to the wireless token. For another embodiment, the server may use a conventional certificate server to provide a certificate for the user's public key. The server further returns the biometric template to the wireless token.

At block 850, the certified public key, the private key, biometric template, and pseudonym are stored in secure memory on the wireless token. At this point, the wireless token may be used by a terminal. For one embodiment, if the server is within a corporation, at block 855, the user's pseudonym(s) are added to the access database(s) within the corporation. The process then ends at block 860. In this way, the wireless token can be initialized using a secure server, which may be local or remote. If the secure server is local, and a trusted administrator is available to do registration, identity verification may be simplified. For example, the administrator may place his or her authenticated fingerprint on a biometric sensor to indicate that a successful identification has taken place.

Figure 9:
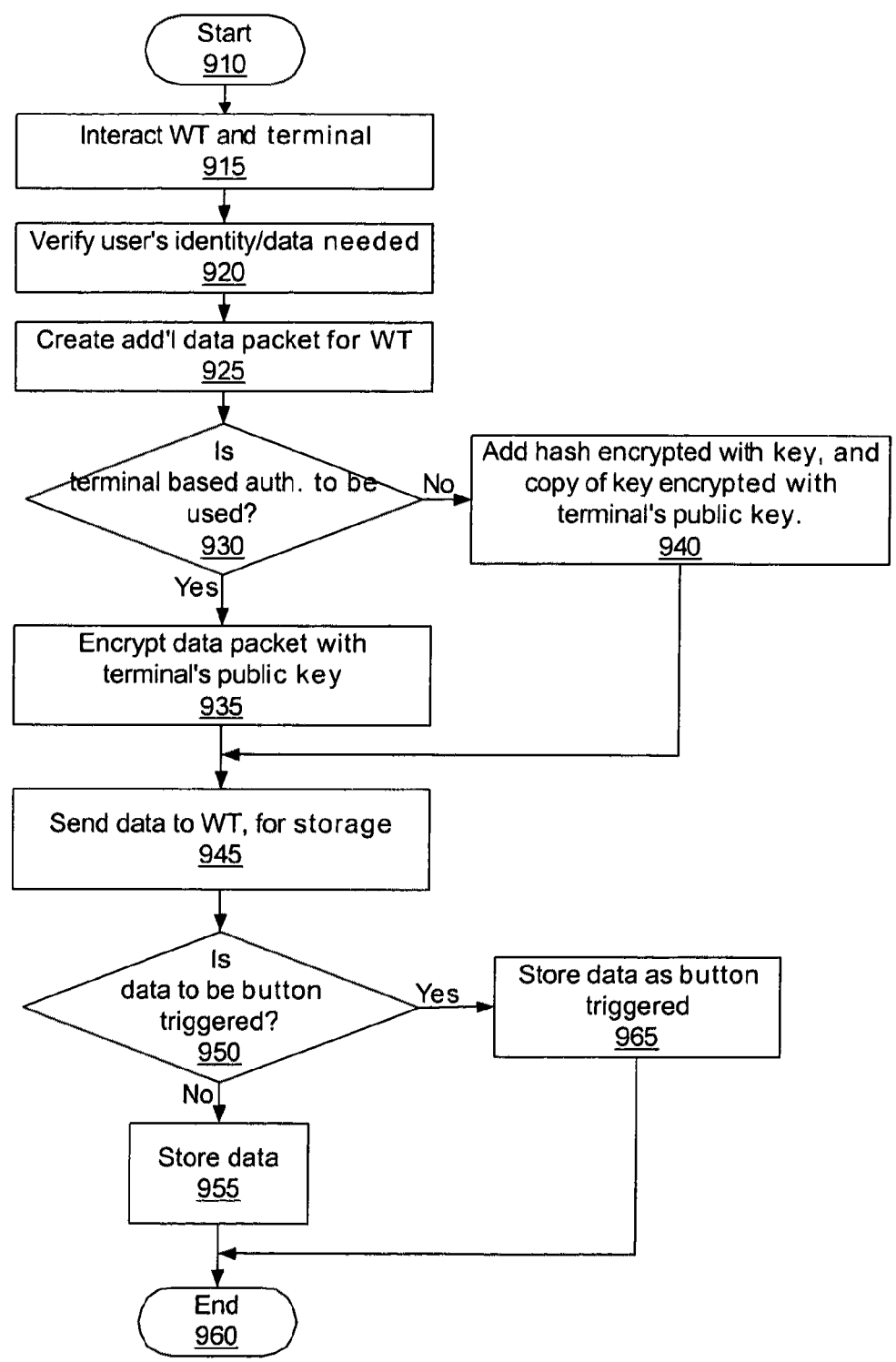
FIG. 9 is a flowchart of one embodiment of initially interfacing a wireless token with a terminal, to add terminal-specific information.

FIG. 9 is a flowchart of one embodiment of interfacing a wireless token with a terminal, to add terminal-specific information. The process starts at block 910, when the connection between the wireless token and a server is initially established. The server may be a terminal, a server that services multiple terminals, a stand-alone system that is used to update an access database, or another system.

At block 915, the wireless token interacts with the server. This process includes establishing a secure link between the wireless token and the system. For one embodiment, the connection may be a wired connection, a wireless connection, or a direct plugged-in connection. If the connection is a direct connection, no secure session needs to be established.

At block 920, the user's identity is verified. For one embodiment, this may be done by connecting to the original authenticating server, by requesting some type of additional authentication, such as a credit card or driver's license, or through some other means. For one embodiment, the system may further verify the user's fingerprint—e.g. that the person being identified is the same person whose fingerprint template is stored on the wireless token as the owner of the token. For another embodiment, the system is attended by an administrator, who can perform the verification.

At block 925, the additional data packet is created for the wireless token. The additional data packet is the data that the terminals wish to use in the future. For example, for an airline terminal, the registration may be at an airline check-in counter. The additional data packet may include the user's full legal name, home address, and country of citizenship. Additional information such as drivers license number, and passport number may also be included. This is all generated on the server, interactively with the user.

At block 930, the process determines whether the preference is to have terminal based authentication or not. Terminal based authentication means that the data packet is released to any requesting terminal. However, the data packet is encrypted, such that only the terminal having the appropriate key is able to decrypt the data. However, this may be less safe, since a determined hacker can have access to this data over a long period. Therefore, the alternative is to have the wireless token determine whether to release this data or not.

If terminal based authentication is selected, the process continues to block 935. At block 935, a key is used to encrypt the data packet. This ensures that only the terminal(s) that have the key are able to access this data. For one embodiment, the key is a public key associated with this data, and the appropriate private key is available to each of the terminals that would access this data. For another embodiment, the key may be a symmetric key. Copies of the symmetric key would then be available to each of the terminals that have permission to access this data. The process then continues to block 945.

If, at block 930, wireless token-based authentication is selected, the process continues to block 940. At block 940, the data is wrapped in an "envelope" which is encrypted with the terminal's private key. In order to access the data, the terminal must transmit its certified public key, which then must unwrap the envelope. The process then continues to block 945.

At block 945, the data packet is sent to the wireless token.

At block 950, the process determines whether the system wishes to have the data released only in response to a user pushing a button interface on the wireless token. If not, the data is stored, at block 955, and the process ends at block 960. If the system wishes to force a button, the wireless token stores the data as a button-triggered data packet, at block 965. The process then ends at block 960.

In this way, a system can add additional data that would be useful for its authentication and access processes. A single system can add this data packet, and by distributing the keys to the appropriate terminals, all related terminals can access this data.

Figure 10A:
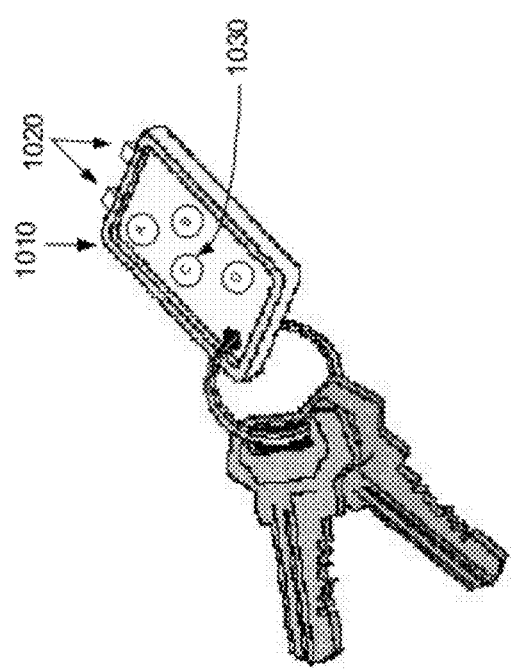
FIGS. 10A-B are illustrations of two embodiments of the wireless token.
Figure 10B:
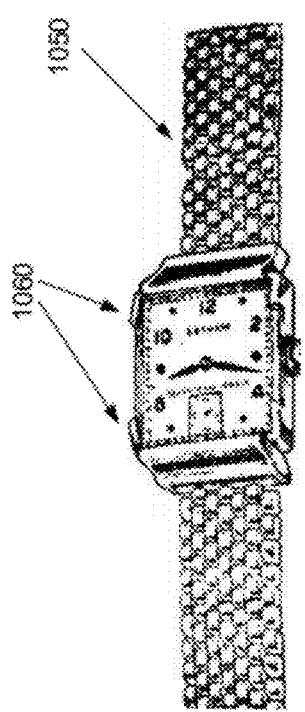

FIGS. 10A-B are illustrations of two embodiments of the wireless token. One example of a wireless token is a key fob 1010, which may be easily carried on the user's key chain. The key fob 1010 generally includes the wireless communications mechanism, processor, and memory described above. The key fob 1010 may further include buttons 1030 to permit interaction if a biometric is unavailable or unacceptably bad, and connectors 1020, to permit a wired connection.

An alternative wireless token is a watch 1050, which includes buttons 1060. Any other native format that would generally be carried by the user at all times may be used. Thus, the shape of the wireless token may range from a key fob, to a smart card format, to a watch, a bracelet, or any other device that would by default be carried on a user's person at all times.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A token comprising:
 a low power receiver to receive an indication indicating a presence of a nearby short-range terminal, the indication including information that expires;
 a wake-up logic to wake up the token in response to receiving the ping;
 a transceiver to return a connection request to the short-range terminal, the connection request including the information that expires, to prove that the ping is recent; and
 an identity verifier to perform a biometric authentication of a user, based on biometric data received from the terminal, by comparing the biometric data received from the terminal with the user's biometric pattern data securely stored on the token, without requiring user interaction with the token, thereby creating a two-factor authentication based on the token the user has and the biometric the user is, and without releasing the biometric pattern data to the terminal.

2. The token of claim 1 implemented as a key fob.

3. The token of claim 1, further comprising:
 a secure session creator to set up a secure communications channel between the wireless token and the short-range terminal.

4. The token of claim 1, further comprising:
 a transceiver to send a pseudonym and a certified public key to the terminal; and
 a secure session creator to establish a secure communications channel between the wireless token and the terminal using the certified public key.

5. The token of claim 1, further comprising:
 a transceiver to receive a biometric template from the terminal, through a secure communications channel; and
 the identity verifier to determine if the biometric template matches a biometric template of the owner of the wireless token.

6. The token of claim 5, wherein the biometric template of the owner of the wireless token is stored in secure memory on the wireless token.

7. The token of claim 5, further comprising:
 the transceiver further to send authentication results to the terminal, to permit the user access, as provided by the terminal.

8. The token of claim 1, further comprising:
 the transceiver to receive periodic maintenance pings after authentication; and
 the transceiver further to respond to the periodic pings verifying the continued proximity of the wireless token to the terminal.

9. The token of claim 1, further comprising:
 insecure pseudonyms released to a terminal in response to a request, when a secure session has been established; and
 secure pseudonyms released to the terminal in response to a request only after biometric authentication of the user.

10. The token of claim 1, further comprising:
 public pseudonyms released to any terminal in response to a request, when a secure session has been established; and
 private pseudonyms released only to the terminal that initially established the private pseudonyms.

11. The token of claim 1, further comprising a timer to put the wireless token back to sleep after an authentication process has been completed.

12. The token of claim 11, further comprising:
 an always-on portion of the wireless token, which remains awake after the wireless token has been put to sleep, to continue monitoring for pings, the always-on portion of the wireless token including the low power receiver.

13. The token of claim 1, wherein the token communicates with the terminal using wireless frequencies.

14. The token of claim 1, wherein the token communicates with the terminal using human skin conductance.

15. A terminal to permit use of a wireless token for authentication, the terminal comprising:
 a ping generator to generate periodic pings, a ping including information that expires;
 a transceiver to receive a connection request from a wireless token, the wireless token sending the connection request in response to receiving the ping, the connection request including the information from the ping, wherein the ping is received when the wireless token is within a radius associated with the terminal, the radius associated with the terminal based on a type of the terminal;
 a biometric sensor to receive a biometric from the user;
 the transceiver to send the biometric to the wireless token, and to receive an authentication from the wireless token confirming an identity of the user, without releasing a biometric template to the terminal;
 a secure session logic to establish a secure session with the wireless token when the information within the connection request is not expired and the wireless token is authorized; and
 access control logic to provide access to a limited access system, in response to receiving authentication information from the wireless token, the authentication information based on the biometric sent by the terminal to the wireless token.

16. The terminal of claim 15, further comprising:
 a biometric sensor to receive biometric data from a user, for authentication;
 a minutia extraction logic to extract a biometric template from the biometric data; and
 the transceiver to send the biometric template via the secure session to the wireless token for authentication of the user by the wireless token.

17. The terminal of claim 15, further comprising:
 a pseudonym verifier to verify that a pseudonym, included as part of the authentication information, and received from the user is in an access database.

18. The terminal of claim 17, further comprising:
 additional data requested by the access control logic, if additional data is needed to provide access.

19. The terminal of claim 15, further comprising:
 a continued access verifier to periodically send out a maintenance ping after a user has been provided access to a limited access system, to verify that the user remains in proximity to the limited access system.

20. The terminal of claim 15, further comprising:
 a random number generator used to generate random numbers for an initial connection between the terminal and the wireless token, such that only a current ping is available for response.

* * * * *